(12) United States Patent
Widdemer

(10) Patent No.: US 6,743,519 B2
(45) Date of Patent: Jun. 1, 2004

(54) SUPPLEMENTARY FIBER STRUCTURE FOR LEATHER AND LEATHER GLOVES, SHOES, GARMENTS AND UPHOLSTERY WITH SUPPLEMENTARY FIBER STRUCTURES AND PROCESS FOR ADDING A SUPPLEMENTARY FIBER STRUCTURE TO LEATHER

(75) Inventor: John D. Widdemer, Gloversville, NY (US)

(73) Assignee: Bali Leathers, Inc., Johnstown, NY (US)

( * ) Notice: Subject to any disclaimer, the term of this patent is extended or adjusted under 35 U.S.C. 154(b) by 188 days.

(21) Appl. No.: 09/922,595

(22) Filed: Aug. 3, 2001

(65) Prior Publication Data

US 2002/0124324 A1 Sep. 12, 2002

Related U.S. Application Data

(60) Provisional application No. 60/223,181, filed on Aug. 4, 2000.

(51) Int. Cl.[7] .............................. B32B 9/04; B32B 5/26; D04H 5/02; D04H 18/00; D04H 11/08
(52) U.S. Cl. ..................... 428/473; 428/16; 428/195; 28/103; 28/105; 28/107; 28/109; 442/327; 442/383
(58) Field of Search ................... 28/103–115; 69/19.2; 428/16, 195, 473, 15; 442/327, 383

(56) References Cited

U.S. PATENT DOCUMENTS

| | | | | |
|---|---|---|---|---|
| 4,426,421 A | * | 1/1984 | Nakamae et al. | 442/271 |
| 4,696,999 A | * | 9/1987 | Spies et al. | 528/319 |
| 5,466,526 A | * | 11/1995 | Magata | 428/372 |
| 6,555,490 B1 | * | 4/2003 | Wildbore et al. | 442/402 |

* cited by examiner

Primary Examiner—Cheryl A. Juska
Assistant Examiner—Lynda M Salvatore
(74) Attorney, Agent, or Firm—Aufrichtig Stein & Aufrichtig, P.C.; Peter D. Aufrichtig

(57) ABSTRACT

An improved leather formed of a leather having an internal matrix and a fiber matrix coupled to the leather matrix, the coupling creating a supplementary fiber matrix in the leather which enhances a characteristic of the leather. The improved leather includes fibers from the fiber matrix which pierce the leather in many locations and interlocking with other fibers both within the internal matrix of the leather and on a first surface of the leather. The improved leather is useful for gloves, shoes, garments, luggage and upholstery.

25 Claims, 3 Drawing Sheets

Fig. #1
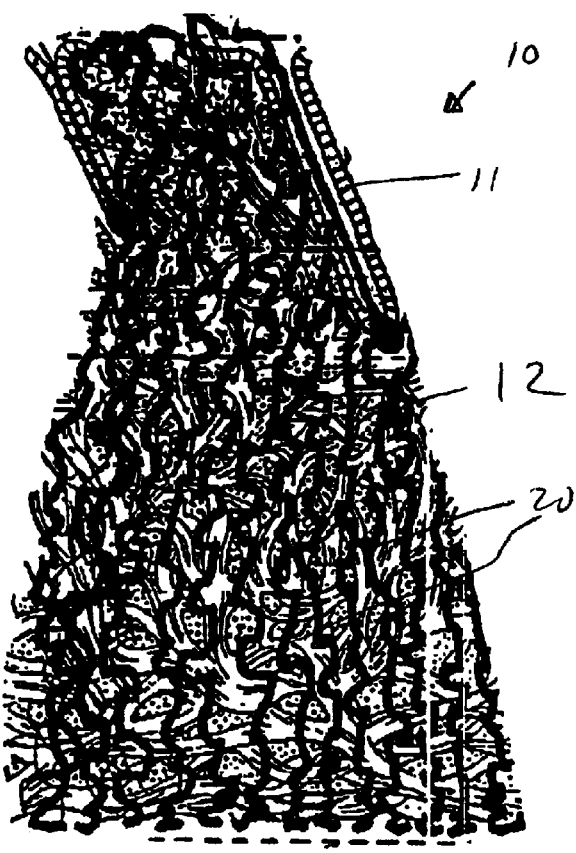
Fig. #2
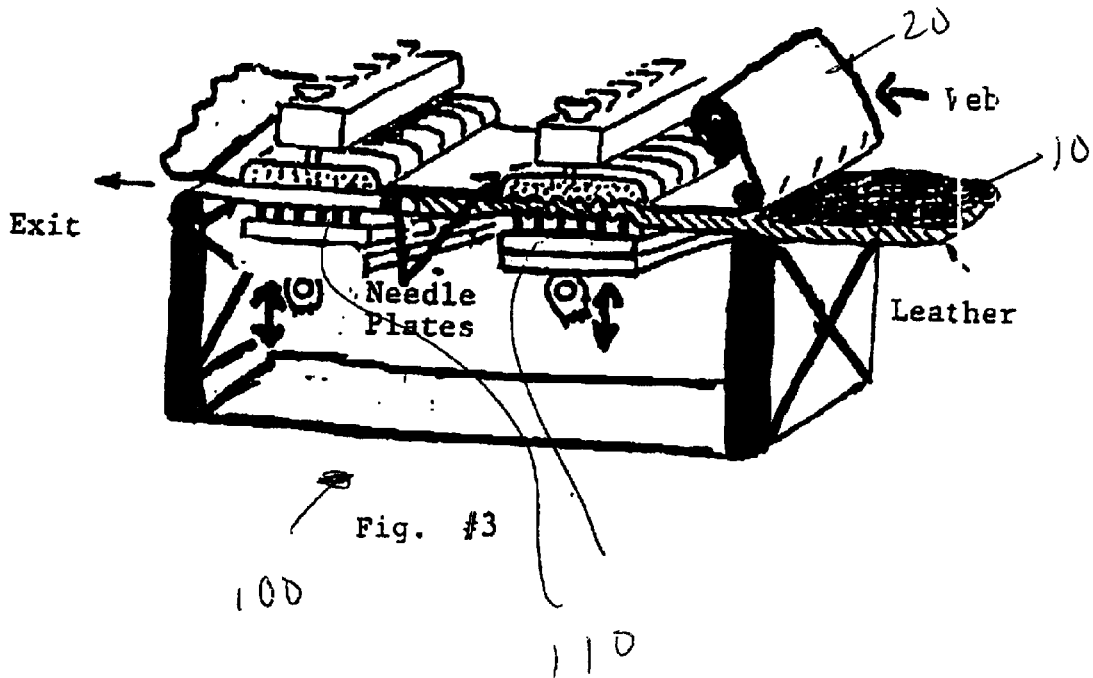
Fig. #3

SUPPLEMENTARY FIBER STRUCTURE FOR LEATHER AND LEATHER GLOVES, SHOES, GARMENTS AND UPHOLSTERY WITH SUPPLEMENTARY FIBER STRUCTURES AND PROCESS FOR ADDING A SUPPLEMENTARY FIBER STRUCTURE TO LEATHER

This application claims the benefit of provisional application 60/223,181 filed Aug. 4, 2000.

BACKGROUND OF THE INVENTION

The invention is generally directed to leather and leather products reinforced by a supplementary fiber structure introduced into the leather by mechanical means providing greatly enhanced tensile strength, abrasion resistance and moisture wicking ability. In particular, the invention is directed to the specific methods for the production of leather with a reinforced fiber structure to be made into products made from such reinforced fiber structure leather such as gloves, shoes, garments, upholstery and luggage.

Leather in its natural state is made up of many interlocking fibers, twisted in a triple helix format, forming a matrix called the "flesh area" of the skin. The separately formed surface or "grain area" is loosely attached to the "flesh area" by collagen links. In finished leather, the thin grain area provides abrasion resistance for the thicker, weaker "flesh area" underneath. The "flesh area" provides the substance and body of the leather. The weak attachment of the "grain area" to the "flesh area" causes many actively used leather products such as shoes, sports gloves, luggage and others to peel under abrasion. That is, the grain area peels away from the flesh area.

Many types of leather are inherently weak and tear easily, such as domestic sheepskin, which restricts their uses and value. Furthermore, although leather is a fairly effective transporter of moisture away from the skin through wicking, it is not nearly as efficient as many modern synthetic fibers. Effective wicking for moisture removal has great value for comfort enhancement in actively used shoes, gloves and other garments. Some leathers are reinforced for strength by bonding another material to their surface, such as a plastic layer. However, this bonding destroys the desirable texture and look of leather and its ability to breathe and wick moisture. In addition, in processing many types of leather a very thin and weak by-product results which is either the grain portion in the case of making suede or the flesh portion in the case of making very thin leathers, such as for book bindings or laminations. These by-products are presently of very low value, but could be increased in value if they were strengthened. Therefore, there is a need for a leather reinforced throughout its fiber structure with a second "matrix" of synthetic fibers, inserted throughout the leather, to enhance abrasion resistance, tensile strength and wicking ability without changing the basic nature and appearance of the leather.

SUMMARY OF THE INVENTION

The invention is generally directed to An improved leather with an internal matrix and a fiber matrix coupled to the leather matrix, the coupling creating a supplementary fiber matrix in the leather which enhances a characteristic of the leather.

The invention is also generally directed to leather into which an artificial fiber matrix has been introduced to enhance abrasion resistance, tear strength, temperature modulation, far infra red penetration and wicking ability.

The invention is also directed to leather products made from leather into which an artificial fiber matrix has been introduced to enhance at least one of improved abrasion resistance, tear strength and wicking ability.

The invention is further directed to a method of increasing the value of leather products by improving characteristics of the leather through addition of a fiber matrix into the leather to provide a hybrid leather product with enhanced physical characteristics.

The invention is also directed to a method of introducing an artificial fiber matrix into leather and leather products to provide at least one of improved abrasion resistance, tear strength and wicking ability.

Accordingly, it is an object of the invention to provide an improved leather which includes an artificial fiber matrix which enhances abrasion resistance, tear strength and wicking ability.

Still another object of the invention is to provide improved leather products including gloves, shoes, garments and upholstery containing an artificial supplementary fiber matrix.

Yet a further object of the invention is to provide an improved leather with a supplementary fiber matrix complementing the leather's matrix which has the ability to strengthen the leather's natural physical characteristics, as well as to bond the "grain area" of the leather to the "flesh area" of the leather more firmly.

Still another object of the invention is to provide a method for adding an artificial supplementary fiber matrix to a leather with its own matrix which enhances the qualities of leather to increase its value and utility.

Still other objects and advantages of the invention will, in part, be obvious and will, in part, be apparent from the specification.

The invention accordingly comprises the features of construction, combinations of elements and arrangements of parts which will be exemplified in the construction as hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a representational cross-sectional illustration of natural leather's fiber structure;

FIG. 2 is a representational cross-sectional illustration of the leather fiber structure of FIG. 1 with the supplementary fiber matrix structure in accordance with the invention;

FIG. 3 is a perspective view of a mechanism for introducing the supplementary fiber matrix into the leather in accordance with a preferred embodiment of the invention;

DETAILED DESCRIPTION OF THE PREFERRED EMBODIMENTS

Figure 4:
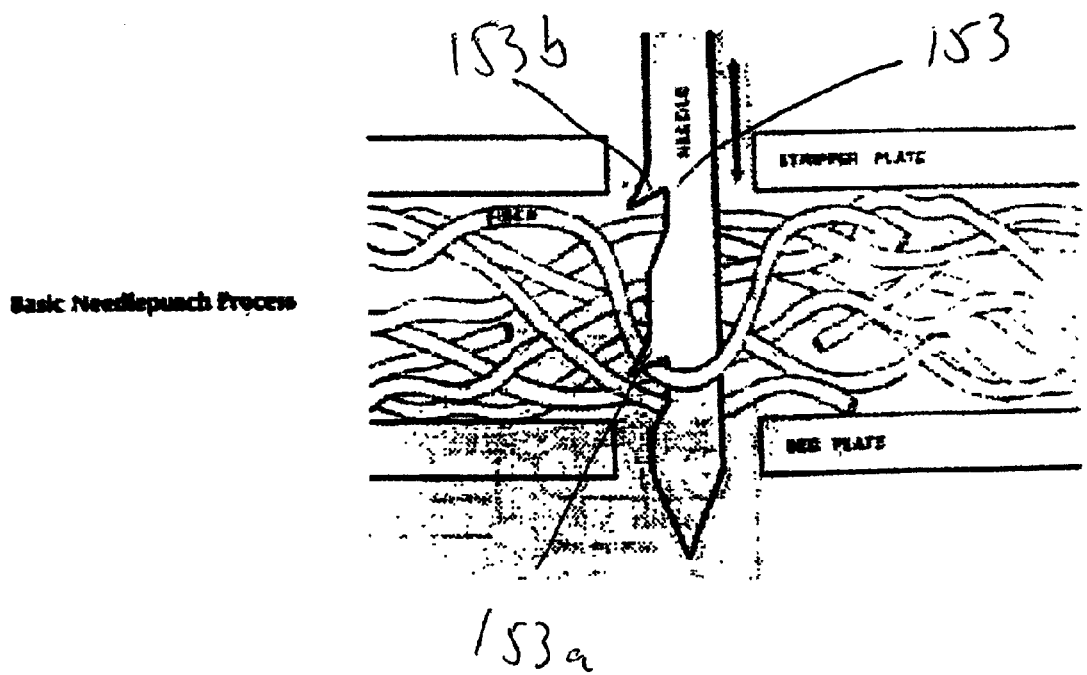
FIG. 4 is a side elevational view of a needle punch operation in accordance with a preferred embodiment of the invention.

In accordance with the invention an improved needle punching process is utilized on tanned leather, skins or hides, inserting throughout their structure an artificial fiber matrix. Reference is made to FIG. 1 wherein a cross section of natural leather's fiber structure, generally indicated as 10, is shown. The actual fiber structure of a leather varies from portion to portion of a single hide, between hides of a similar species of animal and between hides of different species as well. Generally, hides from the same species have similar characteristics with respect to tear strength, abrasion resistance and wicking ability. Different types of leathers are known to have greater or lesser degrees of abrasion resistance, which is the stress that a leather can absorb prior to the grain area 11 separating from the flesh area 12. Some leathers have excellent abrasion resistance but poor tear strength or poor wicking ability. Other leathers have different characteristics with good tear strength but poor abrasion characteristics. In fact, many leathers which have many desirable characteristics, such as a soft hand (soft, smooth feel) have poor tear resistance, abrasion resistance or wicking ability, which degrades its value and usefulness in many application for shoes, gloves, other garments or luggage or upholstery. Generally, leathers which have desirable characteristics across various requirements including tear and abrasion resistance and wicking can be extremely expensive relative to other leathers.

By introducing a supplementary fiber matrix into the leather with a needle punching process, a synergistic benefit is achieved without degrading the valuable and desirable characteristics of the leather.

Depending upon the desired characteristics to be imparted to a leather, fibers of different sorts can be introduced into the original leather matrix to fine tune the final characteristics of the leather. If the leather has desirable abrasion and tear resistance characteristics but poor wicking characteristics, a supplementary fiber matrix formed of polypropylene fibers, known to provide a strong wicking characteristic, can be introduced so that the wicking characteristics of the leather are enhanced. Similarly, if the leather is known to have excellent wicking characteristics but requires enhanced tear resistance and/or abrasion resistance, nylon fibers, which can provide extreme strength to the leather, can be utilized. Depending upon the particular needs, a single fiber or combination of fibers can be introduced into the leather for enhanced value of the leather. The performance of the leather can be further enhanced by the addition of fibers containing phase change materials to help regulate the temperature of the human body in applications such as garments and gloves. Fibers containing certain rare earth powders or complex ceramics can also be added to enhance circulation and promote healing by production of far infrared waves in response to the application of sunlight and/or heat.

Rare earth elements (such as neodymium, titanium and many others) and powdered ceramics have an amplification effect on the far infrared radiation emitted by the human body and present in the background radiation of the earth's environment. When in proximity to the human body these elements and ceramics amplify, reflect and change the infrared radiation from short to long wave radiation so that it penetrates deeply into the body, stimulating the water molecules that make up most of the content of human cells. This creates an inner warmth and concurrently an increased blood flow. The phenomenon is called "electromagnetic resonance". Tests run by Holofiber Enterprises, Inc. of 8950 West Olympic Blvd., Beverly Hills, Calif. 90211, demonstrate with Photopletysmography and by Laser Doppler methods acceleration of blood flow to 15 cm/sec from 11 cm/sec., without raising blood pressure, by application of a complex of reflective ceramics in a textile wrap applied to the subjects' elbows. Similarly, gripping strength was increased by 7% in subjects wearing textile gloves containing these complex ceramics. Zer Corporation of 403 Ace Techno Tower, 684-1, Deungchon-Dong, Kangseo-Gu, Seoul, South Korea, has demonstrated similar results through Kerlian photography and thermal imaging, using rare earth elements such as erbium, neodymium and titanium. The effects of this increased blood flow are to increase nourishment of human cells promoting healing, warming bodily extremities, providing more oxygen for energy to muscles and generally promoting well being. These rare earth elements and complex ceramics can be added to the fiber batts to provide the favorable characteristics of these materials without the difficulties of trying to tan the leather to include these materials.

Figure 5:
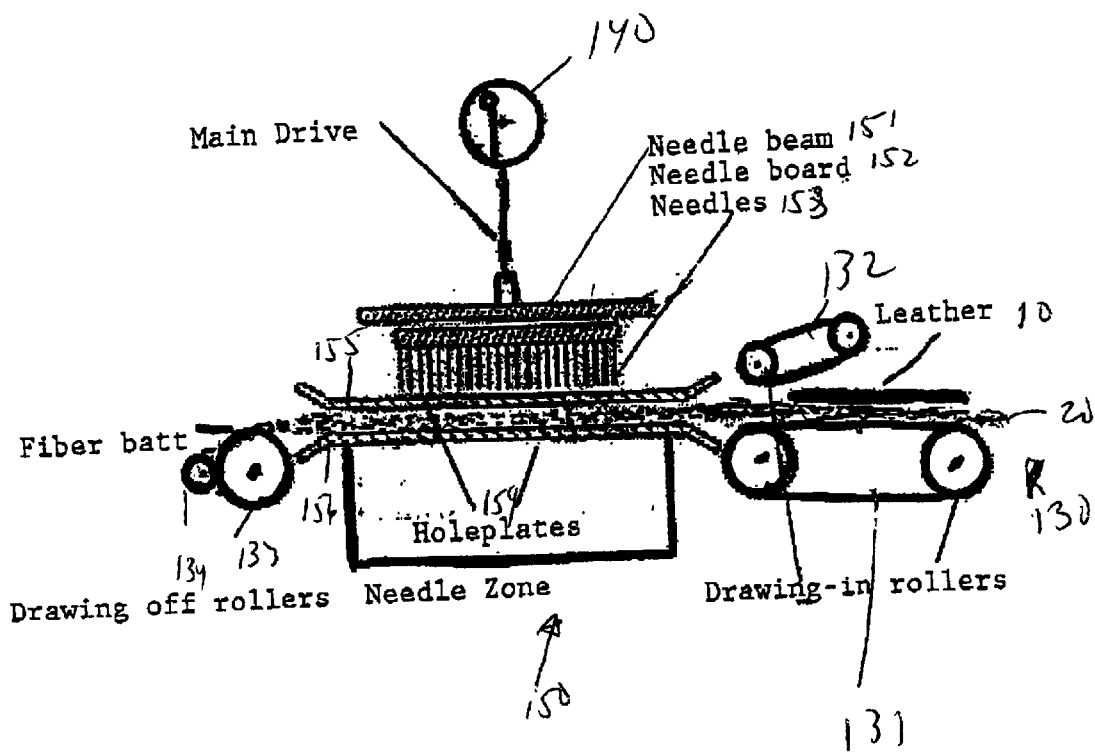
FIG. 5 is a side elevational view of a needle punch mechanism for introducing the supplementary fiber matrix into the leather in accordance with another preferred embodiment of the invention.

In a preferred embodiment, as shown in FIG. 3, a leather 10 is fed through a needle punching mechanism, generally indicated as 100 with a web 20, including the artificial fiber structure, and then passed through a series of needle plates 110. The needlepunching can be set up as shown in FIG. 3 with the leather 10 under the web 20, but, in a more preferred embodiment, as shown in FIG. 5, the leather 10 is on top of the web 20. Because of the regular nature of the web 20 and the generally irregular nature of the leather 10, this arrangement is preferable.

Generally, the basic elements of the needle punching machine are a web feeding mechanism 130, which includes drawing in rollers 131, a needle zone 150 including a needle beam 151 with a needle board 152 and needles 153 (ranging in number from 500 per meter to 7500 per meter of machine width); a stripper plate 155, a bed plate 156 and a fabric take-up mechanism 160 including drawing off rollers 133 and 134. The fiber web 20(sometimes carried or reinforced by a scrim or other fabric) is guided between the metal bed 156 and the stripper plates 155, which have openings corresponding to the arrangements of needles in the needle board. A main drive 140 moves the needle beam 151, needle board 152 and needles 153 vertically through the leather and at least a portion of the fiber batt 20 and then back out of the leather in a repeating cycle.

Needle punch non-wovens are created by mechanically orienting and interlocking the fibers of a spunbonded or carded web. This mechanical interlocking is achieved with thousands of barbed felting needles repeatedly passing into and out of the web. FIG. 4 shows a needle with barbs 153a and 153b which pulls fibers of the fiber web into the leather matrix. The barbs pull the fibers and the needle penetrates into the leather dragging the fibers with them. As the needle is removed from the leather the fibers, which have been pressed into the leather with the needle, remain in place. With the large number of needles, many connections of the fiber into the leather are achieved. FIG. 2 shows the leather 10 of FIG. 1 with a stylized view with fibers from batt 20 punched through. Then, as the leather and fiber are advanced, needle punching provides an extensive interaction and connection between the fiber matrix and the leather matrix such that both the original matrix of the leather and supplementary matrix of the fibers coexist in the leather. The variability of the gauge of the needle, which is dependent upon the coarseness or fineness of the fibers, as well as the needle density, can be varied depending upon the required characteristics of the system. The fiber matrix 20 is generally formed in a batt. As the needle loom beam moves up and down, the blades of the needle penetrate the fibrous batt. Barbs on the needle pick up fibers on the downward movement and carry these fibers the depth of the penetration. The draw roll pulls the batt through the needle loom as the needles reorient the fibers from a predominantly horizontal to almost a vertical position. The more the needles penetrate the web the more dense and strong the web becomes generally. While a production system with a single pass through needlepunching zone 150 is generally utilized, it is possible, where product requirement indicate, to have the needle punching operation run multiple times on the same leather if additional matrix penetration is indicated. Generally, where increased needle punching density is indicated, the needle density is increased. Similarly, the rate of material feed may be altered to increase or decrease the density of the fiber matrix penetration.

The process for inserting the artificial fiber structure into leather involves a belt system conveying tanned hides or skins layered together with a non-woven web of synthetic fibers through a punching area. In one preferred embodiment of the invention the leather and batt are fed continuously into the needlepunching machinery. In another preferred embodiment the leather is fed into the machinery in batches dependent on the size of the skins or other pieces utilized. In the punching area, specially designed multiple needles with barbs, preferably up to about 36 in number, mounted on a needle board, pick up and carry fibers from the non-woven web through the leather. There are preferably between 500 to 7500 needles per meter of belt width, depending on the density of fiber structure required. In the preferred embodiment where the leather is on top of the batt, on the downstroke of the needle board the needles penetrate the leather and fiber batt beneath. On the upstroke each needle barb carries fibers up from the web to the leather, a distance predetermined by the penetration depth of the needle board. On the up stroke the fibers are released from the barbs, embedding the fibers in a random pattern which results in interlocking of the fibers. Loose ends of the fibers can later be buffed off with a mild abrasive that does not damage the leather surface.

Various types and thicknesses of fibers can be inserted into the leather depending upon the leather's end use function. Polypropylene fibers would give maximum wicking effect while nylon fibers will give maximum strength. Multiple fibers can be used in a single application, which could either be performed by creating a fibrous batt including multiple different types of fibers or by attaching a series of different fibrous batts through the needle punching process. One could have a series of flat batts fed into the needle zone along with the leather.

The process of introducing a supplementary fiber structure though the needle punching process can be utilized with both synthetic and natural fibers, depending upon the required characteristics of the finished product and the starting characteristics of the leather. Generally, leathers which have certain undesirable characteristics for specific applications can be made suitable through the introduction of appropriate types of fiber with appropriate fiber density. Leather can be needlepunched either in its natural, irregular shape (as a full or partial skin) which does result in a significant loss of batting or can be needlepunched as cut components of a product which can be laid more efficiently on the batt. In either case it is important that the leather be pretreated or handled to make it lie flat. This can either be done through the equipment used which is set to hold the leather flat or through a "toggling" process in which skins or parts are first dampened and then attached with clamps to a screen that is rolled into a heating oven. This firms and sets the leather so that it will lie flat on the batt and receive the needlepunching evenly. In a preferred embodiment of the invention the leather panels used to make a glove can be cut from the leather after it has been tanned. Since the pieces are each relatively small, it is well known to cut these pieces out in an efficient use of the leather on a skin. Thereafter, the pieces can be arranged on the batt for the needlepunching operation so that efficient processing is assured. In this way, once the excess batting around each of the pieces is removed, the completed panels can be assembled into a glove in a conventional fashion. It is thus not necessary to cut the glove and batting together in this configuration.

In another preferred embodiment of the invention, scrap leather not used in production can be fitted together and then formed into a single unit by the needlepunching process. In some cases a removable protective layer may be added on top of the leather to protect it and to keep the smaller pieces of leather together. Alternatively, and preferably the mechanism is set up so that the leather can stay in place without the need for additional materials until the needle punching makes its attachment to the batt through the supplemental fiber matrix permanent. This leather will probably be of lower quality due to the gaps between pieces of the leather, but may provide a low cost alternative material with good characteristics in view of the strength and other improvements to the leather by the needlepunching.

The leathers enhanced with a supplementary fiber structure can be used for gloves, footwear, upholstery, luggage, garments or other leather uses. The supplementary fiber structure can enhance a variety of characteristics of the leather, allowing the use of leathers with some desirable characteristics but other undesirable characteristics for more applications by improving the characteristics which are otherwise undesirable without negatively impacting the desirable characteristics.

It will thus be seen that the objects set forth above, among those made apparent in the preceding description, are efficiently obtained and, since certain changes may be made in the above constructions without departing from the spirit and scope of the invention, it is intended that all matter contained in the above description or shown in the accompanying drawings shall be interpreted as illustrative, and not in a limiting sense.

It is also to be understood that the following claims are intended to cover all of the generic and specific features of the invention, herein described and all statements of the scope of the invention which, as a matter of language, might be said to fall therebetween.

What is claimed is:

1. An improved leather, comprising:
    a leather having an internal matrix; and
    a fiber matrix coupled to the leather matrix, the coupling creating a supplementary fiber matrix in the leather which enhances a characteristic of the leather wherein the fiber matrix includes fibers piercing the leather in many locations and interlocking with other fibers both within the internal matrix of the leather and on a first surface of the leather.

2. The improved leather of claim 1 wherein the fiber matrix is in the form of a non-woven batt.

3. The improved leather of claim 1 wherein the coupling includes a multiplicity of fibers of the fiber matrix individually located within the internal matrix of the leather through entry points in a first surface of the leather.

4. The improved leather of claim 1 wherein the improved leather is formed as a two layer composite, the first layer being the fiber matrix in the form of a batt and the second layer being the leather together with a multiplicity of fibers from the fiber forming the supplementary matrix in the internal matrix of the leather, the multiplicity of fibers forming the supplementary matrix holding the first and second layers together.

5. The improved leather of claim 1 wherein the fiber matrix includes materials in the fibers to enhance tear resistance of the leather.

6. The improved leather of claim 1 wherein the fiber matrix includes materials in the fibers to enhance abrasion resistance of the leather.

7. The improved leather of claim 1 wherein the fiber matrix includes materials in the fibers to enhance temperature regulation of the leather.

8. The improved leather of claim 1 wherein the fiber matrix includes materials in the fibers to enhance far infrared radiation of the leather.

9. The improved leather of claim 1 wherein the fiber matrix includes materials in the fibers to enhance wicking ability of the leather.

10. The improved leather of claim 1 wherein the improved leather is used for gloves, shoes, garments and upholstery.

11. A glove made from an improved leather, the improved leather comprising:
   a leather having an internal matrix; and
   a fiber matrix coupled to the leather matrix, the coupling creating a supplementary fiber matrix in the leather which enhances a characteristic of the leather wherein the fiber matrix includes fibers piercing the leather in many locations and interlocking with other fibers both within the internal matrix of the leather and on a first surface of the leather.

12. The glove of claim 11 wherein the fiber matrix is in the form of a non-woven batt.

13. The glove of claim 11 wherein the coupling includes a multiplicity of fibers of the fiber matrix individually located within the internal matrix of the leather through entry points in a first surface of the leather.

14. A shoe made from an improved leather, the improved leather comprising:
   a leather having an internal matrix; and
   a fiber matrix coupled to the leather matrix, the coupling creating a supplementary fiber matrix in the leather which enhances a characteristic of the leather wherein the fiber matrix includes fibers piercing the leather in many locations and interlocking with other fibers both within the internal matrix of the leather and on a first surface of the leather.

15. The shoe of claim 14 wherein the fiber matrix is in the form of a non-woven batt.

16. The shoe of claim 14 wherein the coupling includes a multiplicity of fibers of the fiber matrix individually located within the internal matrix of the leather through entry points in a first surface of the leather.

17. A garment made from an improved leather, the improved leather comprising:
   a leather having an internal matrix; and
   a fiber matrix coupled to the leather matrix, the coupling creating a supplementary fiber matrix in the leather which enhances a characteristic of the leather wherein the fiber matrix includes fibers piercing the leather in many locations and interlocking with other fibers both within the internal matrix of the leather and on a first surface of the leather.

18. The garment of claim 17 wherein the fiber matrix is in the form of a non-woven batt.

19. The garment of claim 17 wherein the coupling includes a multiplicity of fibers of the fiber matrix individually located within the internal matrix of the leather through entry points in a first surface of the leather.

20. An upholstered item made of improved leather, the improved leather comprising:
   a leather having an internal matrix; and
   a fiber matrix coupled to the leather matrix, the coupling creating a supplementary fiber matrix in the leather which enhances a characteristic of the leather herein the fiber matrix includes fibers piercing the leather in many locations and interlocking with other fibers both within the internal matrix of the leather and on a first surface of the leather.

21. The upholstered item of claim 20 wherein the fiber matrix is in the form of a non-woven batt.

22. The upholstered item of claim 20 wherein the coupling includes a multiplicity of fibers of the fiber matrix individually located within the internal matrix of the leather through entry points in a first surface of the leather.

23. A luggage item made of improved leather, the improved leather comprising:
   a leather having an internal matrix; and
   a fiber matrix coupled to the leather matrix, the coupling creating a supplementary fiber matrix in the leather which enhances a characteristic of the leather wherein the fiber matrix includes fibers piercing the leather in many locations and interlocking with other fibers both within the internal matrix of the leather and on a first surface of the other leather.

24. The luggage item of claim 23 wherein the fiber matrix is in the form of a non-woven batt.

25. The luggage item of claim 23 wherein the coupling includes a multiplicity of fibers of the fiber matrix individually located within the internal matrix of the leather through entry points in a first surface of the leather.

* * * * *